United States Patent [19]

Decker et al.

[11] 3,999,442
[45] Dec. 28, 1976

[54] CONTROL DEVICE HAVING LOCKING SELECTOR MEANS

[75] Inventors: Cloyd E. Decker; Robert S. Crawford, both of Indiana, Pa.

[73] Assignee: Robertshaw Controls Company, Richmond, Va.

[22] Filed: Sept. 10, 1975

[21] Appl. No.: 612,221

[52] U.S. Cl. .............................. 74/10 R; 74/10.15; 74/553; 200/14; 200/11 C; 200/18; 403/335
[51] Int. Cl.² ........................................ F16H 35/18
[58] Field of Search ............... 74/10 R, 10.1, 10.15, 74/553; 200/14, 11 C, 11 G, 18, 20; 403/335

[56] References Cited

UNITED STATES PATENTS

| | | | |
|---|---|---|---|
| 1,588,039 | 6/1926 | Monosmith | 74/10 |
| 2,810,435 | 10/1957 | Demietal | 74/10 |
| 2,899,841 | 8/1959 | Melloy | 74/553 |
| 3,557,637 | 1/1971 | Tonczak | 74/553 |
| 3,688,885 | 9/1972 | Cummings | 74/12.4 S |

*Primary Examiner*—Samuel Scott
*Assistant Examiner*—Randall Heald
*Attorney, Agent, or Firm*—Candor, Candor & Tassone

[57] ABSTRACT

A control device having a support and a first selector member rotatably carried by the support. A second selector member is rotatably carried by the support and is axially movable relative to the support and the first selector member. The selector members are coupled together in a manner to cause the first selector member to rotate in unison with the second selector member when the second selector member is rotated. A pair of spaced spring members are disposed between and respectively engage the selector members to tend to maintain the second selector member axially away from the first selector member. The first selector member has a cylindrical part extending therefrom and the second selector member has a C-shaped shaft rotatably disposed against the cylindrical part of the first selector member. A tang extends radially outwardly from the second selector member and is received between two spaced apart abutments on a surface of the support when the second selector member is in one rotational position thereof so that the second selector member is locked in that one rotational position until the second selector member is axially moved toward the first selector member a certain amount.

26 Claims, 10 Drawing Figures

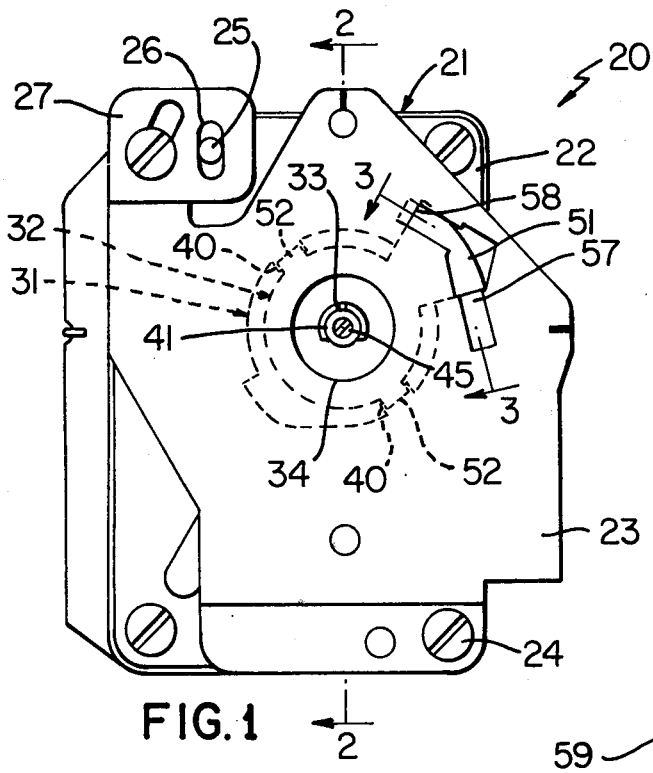
FIG.1
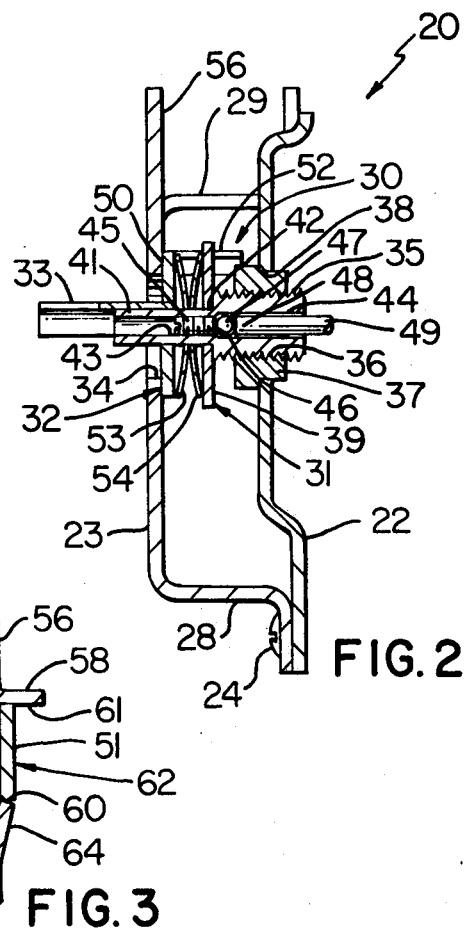
FIG.2
FIG.3
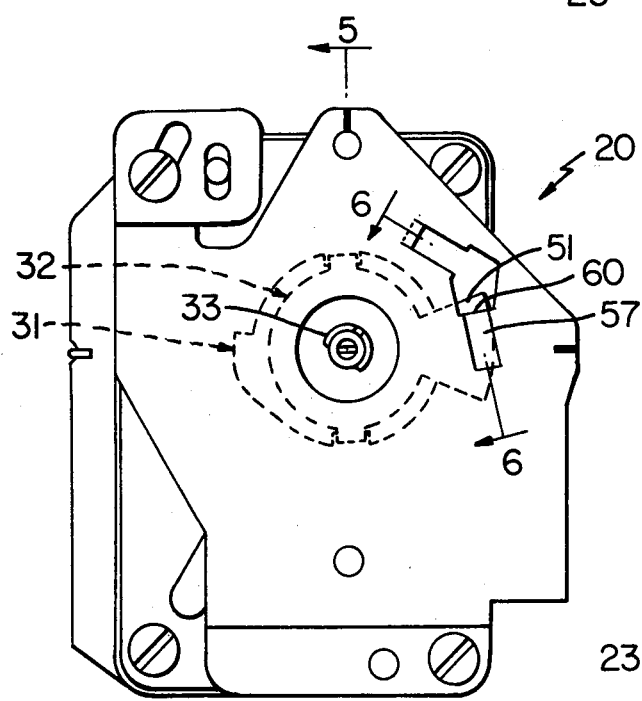
FIG.4
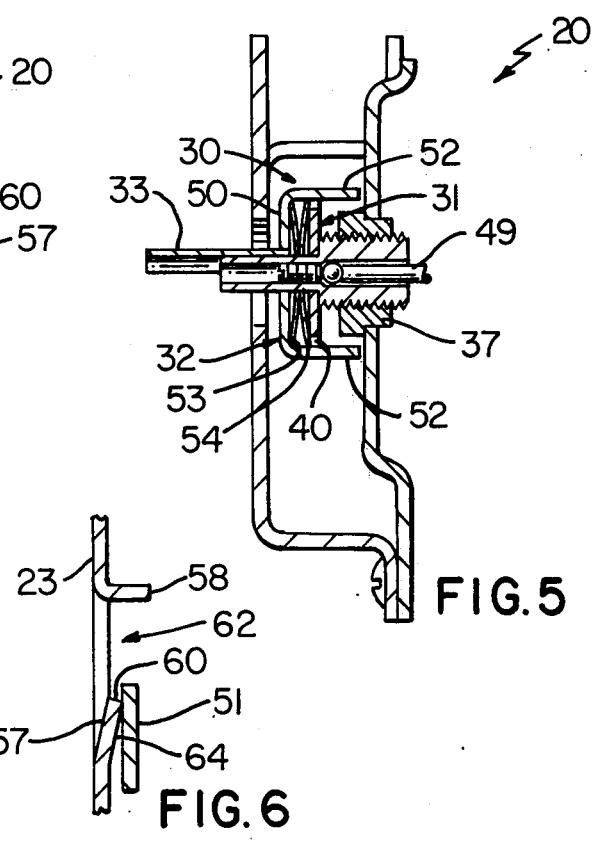
FIG.5
FIG.6

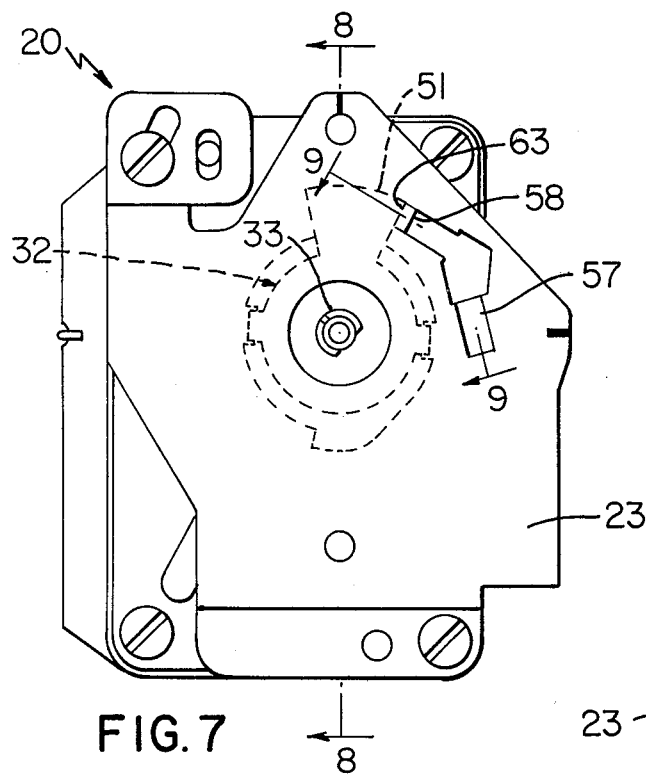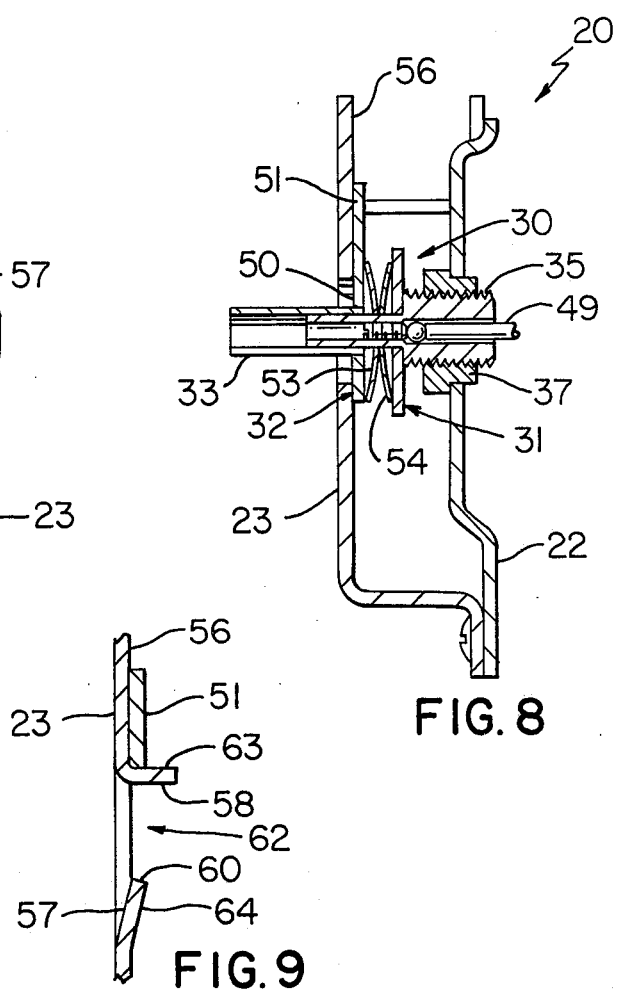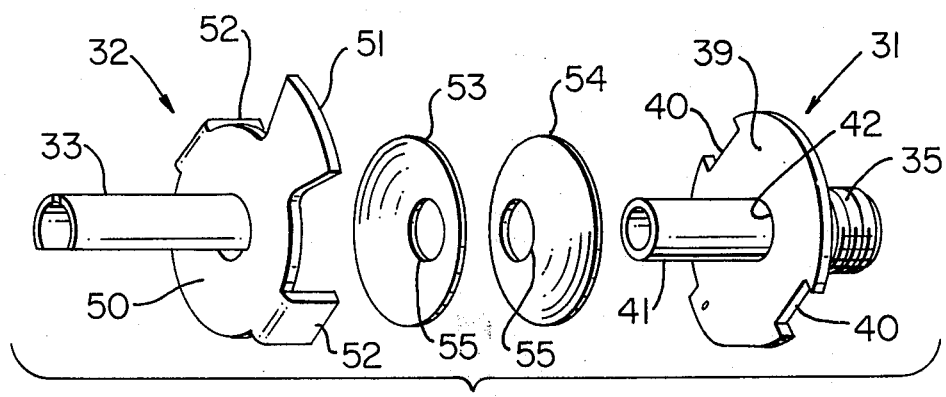

CONTROL DEVICE HAVING LOCKING SELECTOR MEANS

This invention relates to improved selector means for a control device or the like.

In particular, it is well known that various control devices have been provided wherein each has a selector means for setting the control device at the desired setting thereof. Some of such control devices each has a locking means that will lock the selector means in an "off" position thereof so that an unlocking action of the selector means must take place before the selector means can be moved to the desired setting thereof in order to prevent accidental operation of such control device. For example, such selector means are normally rotatable to the desired setting thereof and when the selector means is in the off position thereof, the selector means is locked in the off position thereof until the selector means is axially moved a certain distance to permit the same to be subsequently rotated to a desired setting thereof.

It is a feature of this invention to provide improved locking selector means for such a control device or the like.

In particular, one embodiment of this invention provides a control device having support means and a first selector member rotatably carried by the support means. A second selector member is rotatably carried by the support means and is axially movable relative to the support means and to the first selector member. The selector members have means coupling the same together to cause the first selector member to rotate in unison with the second selector member when the second selector member is rotated. Spring means are disposed between the selector members to tend to maintain the second selector member axially away from the first selector member. The spring means comprise a pair of disc spring members disposed between and respectively engaging the selector members. The first selector member has a cylindrical part extending therefrom and the second selector member has a C-shaped shaft rotatably disposed against the cylindrical part of the first selector member to rotatably support the same in the control device. Locking means are provided for locking the second selector member in one rotational position thereof until the second selector member is axially moved toward the first selector member a certain amount. The locking means comprises a surface on the support means that has two abutments extending therefrom and a tang extending radially outwardly from the second selector member and being received between the abutments when the second selector member is in the one position thereof.

Accordingly, it is an object of this invention to provide an improved control device having one or more of the novel features set forth above or hereinafter shown or described.

Other objects, uses and advantages of this invention are apparent from a reading of this description which proceeds with reference to the accompanying drawings forming a part thereof and wherein:

FIG. 1 is a front view of the improved control device of this invention with certain parts thereof having been removed.

FIG. 2 is a cross-sectional view taken on line 2—2 of FIG. 1.

FIG. 3 is a fragmentary, cross-sectional view taken substantially on line 3—3 of FIG. 1.

FIG. 4 is a view similar to FIG. 1 and illustrates the control device after the selector means thereof has been unlocked and slightly turned from the off position of FIG. 1.

FIG. 5 is a cross-sectional view taken on line 5—5 of FIG. 4.

FIG. 6 is a fragmentary, cross-sectional view taken on line 6—6 of FIG. 4.

FIG. 7 is a view similar to FIG. 1 and illustrates the control device in its fully "on" position.

FIG. 8 is a cross-sectional view taken on line 8—8 of FIG. 7.

FIG. 9 is a fragmentary, cross-sectional view taken on line 9—9 of FIG. 7.

FIG. 10 is an exploded perspective view of the selector members and spring members of the control device of FIG. 1.

While the various features of this invention are hereinafter described and illustrated as being particularly adapted to adjust a control rod of a control device, it is to be understood that the various features of this invention can be utilized singly or in any combination thereof to provide adjusting means for other types of control devices as desired.

Therefore, this invention is not to be limited to only the embodiment illustrated in the drawings, because the drawings are merely utilized to illustrate one of the wide variety of uses of this invention.

Referring now to FIGS. 1, 2 and 3, the improved control device of this invention is generally indicated by the reference numeral 20 and comprises a support means that is generally indicated by the reference numeral 21 and includes a rear plate 22 and a front plate 23 suitably secured together by fastening means 24 with the front plate 23 being properly oriented relative to the rear plate 22 by receiving a locating pin 25 of the plate 22 in a locating slot 26 of a bracket member 27 thereof, the plates 22 and 23 being suitably spaced from each other by appropriate bent portions 28 and 29 of the front plate 23 as illustrated.

A selector means of this invention is provided for the control device 20 and is generally indicated by the reference numeral 30, the selector means 30 comprising a first selector member 31 and a second selector member 32 having a C-shaped shaft 33 projecting out of suitable opening means 34 in the front plate 23 to have a conventional control knob disposed thereon for turning the second selector member 32 for a purpose hereinafter described.

The first selector member 31 has an externally threaded cylindrical part 35 threadedly disposed in a threaded bore 36 of a bushing 37 fastened in an opening 38 of the rear plate 22 as illustrated whereby rotation of the first selector member 31 causes the same to thread into or out of the threaded bushing 37 so that the same is axially displaced relative to the rear plate 22 for a purpose hereinafter described.

The first selector member 31 has a disc-like part 39 fastened to one end of the cylindrical part 35 and the same is provided with a pair of diametrically opposed slot means 40 passing completely therethrough as best illustrated in FIG. 10.

A reduced cylindrical part 41 of the first selector member 31 projects out through an opening 42 in the disc-like part 39 in a direction opposite from the threaded part 35 thereof for a purpose hereinafter described, the cylindrical part 41 having a threaded bore 43 passing therethrough and joining with an unthreaded bore 44 passing through the externally threaded part 35 thereof as illustrated in FIG. 2.

In this manner, a threaded adjusting member 45 is threadedly disposed in the threaded opening 43 of the first selector member 31 and has a free end 46 adapted to abut against a ball 47 disposed in the unthreaded bore 44 of the selector member 31 and bears against an end 48 of an adjusting rod 49 or diaphragm stud that can be urged against the ball 47 by a condition responsive device or other actuator of the control device 20 as desired. Thus, axial movement of the rod 49 relative to the support means 21 of the control device 20 either by the selector member 31 being axially moved in the threaded bushing 37 or by the adjusting member 45 being axially moved in the threaded bore 43 of the selector member 31 causes the condition responsive means for the control device 20 to be set to operate in a desired manner, the adjusting member 45 normally being a factory setting member for calibration purposes and the selector member 31 being utilized by the operator in the field in the conventional manner.

The second selector member 32 has a disc-like part 50 interconnected to one end of the C-shaped shaft 33 and is provided with a radially outwardly extending tang 51 which has a substantially truncated triangular configuration with the smaller base thereof being interconnected to the remainder of the disc 50 for a purpose hereinafter described. A pair of bent tongues 52 extend at right angles from the disc-like part 50 and are diametrically opposed to each other while being parallel to each other as well as parallel to the shaft 33 as illustrated.

In this manner, the tongues 52 of the second selector member 32 are adapted to be respectively received in the slots 40 of the first selector member 31 to spline the same together between the frame plates 22 and 23 whereby rotational movement of the first selector member 32 causes like rotational movement of the first selector member 31 while the spline relationship permits the second selector member 32 to be axially movable relative to the first selector member 31 for a purpose hereinafter described.

A pair of dished spring washer members 53 and 54 are provided for the selector means 30 and each has an opening 55 passing through the bowed central portion thereof so that the spring members 53 and 54 can telescopically receive the cylindrical part 41 of the first selector member 31 through the openings 55 thereof, the dished spring members 53 and 54 having the convex sides thereof disposed in compressed abutting relation and being respectively disposed in compression relation between the disc parts 39 and 50 of the selector members 31 and 32 in the manner illustrated in FIG. 2 so as to always tend to urge the second selector member 32 axially away from the first selector member 31. In this manner, the disc-like part 50 of the second selector member 32 is normally disposed against an inside surface 56 of the front support plate 23 as illustrated for a purpose hereinafter described.

The front plate 23 is provided with a pair of abutments 57 and 58 which extend outwardly from the rear surface 56 of the front plate 23 as best illustrated in FIG. 3, the abutment 58 being disposed substantially at right angles relative to the surface 56 while the abutment 57 forms an acute angle therewith. The abutments 57 and 58 can be respectively carved and punched from the plates 23 so that the same define a slot 59 therein, the abutment 57 having a free end 60 disposed spaced from a side surface 61 of the abutment 58 to define a locking space 62 therebetween in which the tang 51 of the second selector member 32 is adapted to be set when the second selector member is disposed in its off position as illustrated in FIGS. 1–2. Thus, the locked selector member 32 cannot be rotated in either a clockwise or counterclockwise direction of FIG. 1 as the abutments 57 and 58 hold the tang 51 from rotational movement relative thereto.

Thus, it can be seen that the selector means 30 for the control device 20 of this invention can be formed of a relatively few parts in a simple and effective manner to operate in a manner now to be described.

With the control device 20 disposed in the off condition of FIGS. 1–3, the second selector member 32 is locked in such position by the tang 51 thereof being disposed between the abutments 57 and 58 of the front plate 23 whereby the selector member 32 cannot be merely rotated from the off position of FIGS. 1–3 until the same is unlocked from the abutments 57 and 58. In this manner, an accidental bumping of the control knob on the shaft 33 will not turn on the control device 20. Also, with the second selector member 32 disposed in the off position of FIGS. 1 and 3, the first selector member 31 is in such an axial position that the action of the adjusting member 45 on the ball 47 and actuator rod 49 of the control device 20 is such that the same sets the control device 20 itself in its off condition.

However, should the operator desire to turn the control device 20 to a certain on condition thereof, the operator merely presses axially inwardly on the shaft 33 of the second selector member 32 to move the second selector member 32 axially to the right in the drawings and thereby further compresses the spring members 53 and 54 to permit the disc-like part 50 of the second selector member 32 to move to the right until the tang 51 clears the free end 60 of the abutment 57 whereby the operator can then rotate the shaft 33 in a clockwise direction in FIG. 1 as illustrated in FIGS. 4–6 since the tang 51 can now slide past the free end 60 of the abutment 57. At this time, a release of the inward pushing force on the shaft 33 will permit the compressed spring members 53 and 54 to tend to move the second selector member 32 back to the left but the tang 51 will engage against the abutment 57 as illustrated in FIG. 6 and prevent the disc 50 from being moved back into its locked condition so that the shaft 33 can be further rotated in a clockwise direction to set the selector means 50 at the desired setting thereof, such clockwise rotation of the selector means 30 causing the first selector member 31 to be moved axially within the threaded bushing 37 to set the actuating rod 49 to the desired setting for the control device 20.

Therefore, as the second selector member 32 is further rotated in a clockwise direction to the desired setting for the control device 20 from the position illustrated in FIGS. 4–6, the disc part 50 of the second selector member 32 is eventually pushed against the surface 56 of the front plate 23 after the tang 51 has completely cleared the abutment 57 in the manner illustrated in FIG. 9.

The abutment 58 sets the limit for rotation of the selector member 32 in a clockwise direction from its off position because when the tang 51 hits the other side 63 of the abutment 58 in the manner illustrated in FIGS. 7–9, the selector member 32 is prevented from further moving in the clockwise direction so that the abutment 58 also performs a high limit stop for the selector means 30.

Should it be desired to subsequently turn off the control device 20 from an on condition thereof, the operator merely rotates the shaft 33 of the second selector 32 in a counterclockwise direction whereby as the tang 51 of the second selector 52 subsequently engages against the abutment 57, the tang 51 will ride up the sloping surface 64 of the abutment 57 to cam past the free end 60 thereof and be snapped into the space 62 between the abutments 57 and 58 by the force of the spring members 53 and 54 without requiring the operator to axially move the selector member 32 when he is turning the control device 20 to its off condition.

Therefore, it can be seen that the control device 20 of this invention has improved selector means 30 therefor which will permit the control device 20 to be locked in its "off" position and thereby require the operator to axially move inwardly on the selector means before the same can be rotated to the desired temperature setting thereof.

While the form of the invention now preferred has been described and illustrated as required by the Patent Statute, it is to be understood that other forms can be utilized and still fall within the scope of the appended claims.

What is claimed is:

1. In a control device having support means, a first selector member rotatably carried by said support means, a second selector member rotatably carried by said support means and being axially movable relative to said support means and said first selector member, said selector members having means coupling the same together to cause said first selector member to rotate in unison with said second selector member when said second selector member is rotated, and spring means disposed between said selector members to tend to maintain said second selector member axially away from said first selector member, the improvement wherein said spring means comprises a pair of dished spring members disposed between and respectively engaging said selector members, said means coupling said selector members together comprising spline means disposed outboard of said dished spring members and surrounding the same.

2. In a control device as set forth in claim 1, said dished spring members being discs.

3. In a control device as set forth in claim 2, said dished discs having the central portions thereof abutting each other.

4. In a control device as set forth in claim 3, each dished disc has a central opening passing therethrough, one of said selector members having a part thereof telescopically disposed through said openings of said discs.

5. In a control device as set forth in claim 4, said one selector member comprising said first selector member, said part of said first selector member supporting said discs in said control device.

6. In a control device having support means, a first selector member rotatably carried by said support means, a second selector member rotatably carried by said support means and being axially movable relative to said support means and said first selector member, said selector members having means coupling the same together to cause said first selector member to rotate in unison with said second selector member when said second selector member is rotated, and spring means disposed between said selector members to tend to maintain said second selector member axially away from said first selector member, the improvement wherein said first selector member has a cylindrical part extending therefrom, said second selector member has a C-shaped shaft rotatably disposed against said cylindrical part of said first selector member.

7. In a control device as set forth in claim 6, said cylindrical part of said first selector member having a threaded opening passing therethrough, a threaded adjusting member being threadedly disposed in said threaded opening.

8. In a control device as set forth in claim 7, said first selector member having slot means, said second selector member having tongue means received in said slot means to provide a spline relationship therewith so that said second selector member is axially movable relative to said first selector member through said spline relationship and causes said first selector member to rotate in unison therewith through said spline relationship.

9. In a control device as set forth in claim 8, said slot means comprising two slots disposed diametrically opposite each other, said tongue means comprising a pair of spaced apart parallel tongues respectively received in said slots.

10. In a control device as set forth in claim 9, said tongues being disposed parallel to said C-shaped shaft and being at one end of said second selector member while said C-shaped shaft is at the other end thereof whereby said shaft and said tongues rotatably mount said second selector member in said control device.

11. In a control device having support means, a first selector member rotatably carried by said support means, a second selector member rotatably carried by said support means and being axially movable relative to said support means and said first selector member, said selector members having means coupling the same together to cause said first selector member to rotate in unison with said second selector member when said second selector member is rotated, spring means disposed between said selector members to tend to maintain said second selector member axially away from said first selector member, and locking means for locking said second selector member in one rotational position thereof until said second selector member is axially moved toward said first selector member a certain amount, the improvement wherein said locking means comprising a surface on said support means that has two abutments extending therefrom, said locking means comprising a tang extending radially outwardly from said second selector means and being received between said abutments when said second selector member is in said one position thereof.

12. In a control device as set forth in claim 11, one of said abutments being engageable with said tang when said second selector member is rotated in one direction a certain amount.

13. In a control device as set forth in claim 11, one of said abutments being disposed at substantially a right angle relative to said surface.

14. In a control device as set forth in claim 11, one of said abutments being disposed at an acute angle relative to said surface.

15. In a control device as set forth in claim 14, said one abutment having a free end disposed spaced from said surface and being disposed adjacent the other abutment.

16. In a control device as set forth in claim 11, said tang having a generally truncated triangular configuration with the smaller base thereof joining with the remainder of said second selector member.

17. In a control device as set forth in claim 11, said spring means comprising a pair of dished spring members disposed between and respectively engaging said selector members.

18. In a control device as set forth in claim 17, said dished spring members being discs.

19. In a control device as set forth in claim 18, said dished discs having the central portions thereof abutting each other.

20. In a control device as set forth in claim 19, each dished disc has a central opening passing therethrough, one of said selector members having a part thereof telescopically disposed through said openings of said discs.

21. In a control device as set forth in claim 20, said one selector member comprising said first selector member, said part of said first selector member supporting said discs in said control device.

22. In a control device as set forth in claim 11, said first selector member having a cylindrical part extending therefrom, said second selector member has a C-shaped shaft rotatably disposed against said cylindrical part of said first selector member.

23. In a control device as set forth in claim 22, said cylindrical part of said first selector member having a threaded opening passing therethrough, a threaded adjusting member being threadedly disposed in said threaded opening.

24. In a control device as set forth in claim 23, said first selector member having a slot means, said second selector member having tongue means received in said slot means to provide a spline relationship therewith so that said second selector member is axially movable relative to said first selector member through said spline relationship and causes said first selector member to rotate in unison therewith through said spline relationship.

25. In a control device as set forth in claim 24, said slot means comprising two slots disposed diametrically opposite each other, said tongue means comprising a pair of spaced apart parallel tongues respectively received in said slots.

26. In a control device as set forth in claim 25, said tongues being disposed parallel to said C-shaped shaft and being at one end of said second selector member while said C-shaped shaft is at the other end thereof whereby said shaft and said tongues rotatably mount said second selector member in said control device.

* * * * *